May 30, 1939. H. G. HOLMES 2,160,145
WHEEL ALIGNING APPARATUS
Filed May 10, 1937 2 Sheets-Sheet 1

INVENTOR.
Herbert Glenn Holmes.
BY Philip A. Minnis
ATTORNEY.

INVENTOR.
Herbert Glenn Holmes.
BY Philip A. Minnis
ATTORNEY.

Patented May 30, 1939

2,160,145

UNITED STATES PATENT OFFICE 2,160,145

WHEEL ALIGNING APPARATUS

Herbert Glenn Holmes, Lansing, Mich., assignor to Food Machinery Corporation, San Jose, Calif., a corporation of Delaware Application May 10, 1937, Serial No. 141,679

17 Claims. (Cl. 33—203)

The present invention is concerned with wheel aligning equipment and relates more particularly to an improved means for gauging the king pin inclination of the front wheels of automotive vehicles.

It is a general object of the invention to provide improved gauge means for determining the king pin inclination of dirigible wheels.

Another object of the invention is to provide a gauging device of the character referred to which is simple in construction and has a simple and speedy operation.

Another object of the invention is to provide a gauge device of the character described which can be readily used with conventional types of aligning heads already in use.

Other objects will be noted from the following description of the preferred embodiment of the invention which is described in connection with the accompanying drawings, in which.

Figures 1, 2:
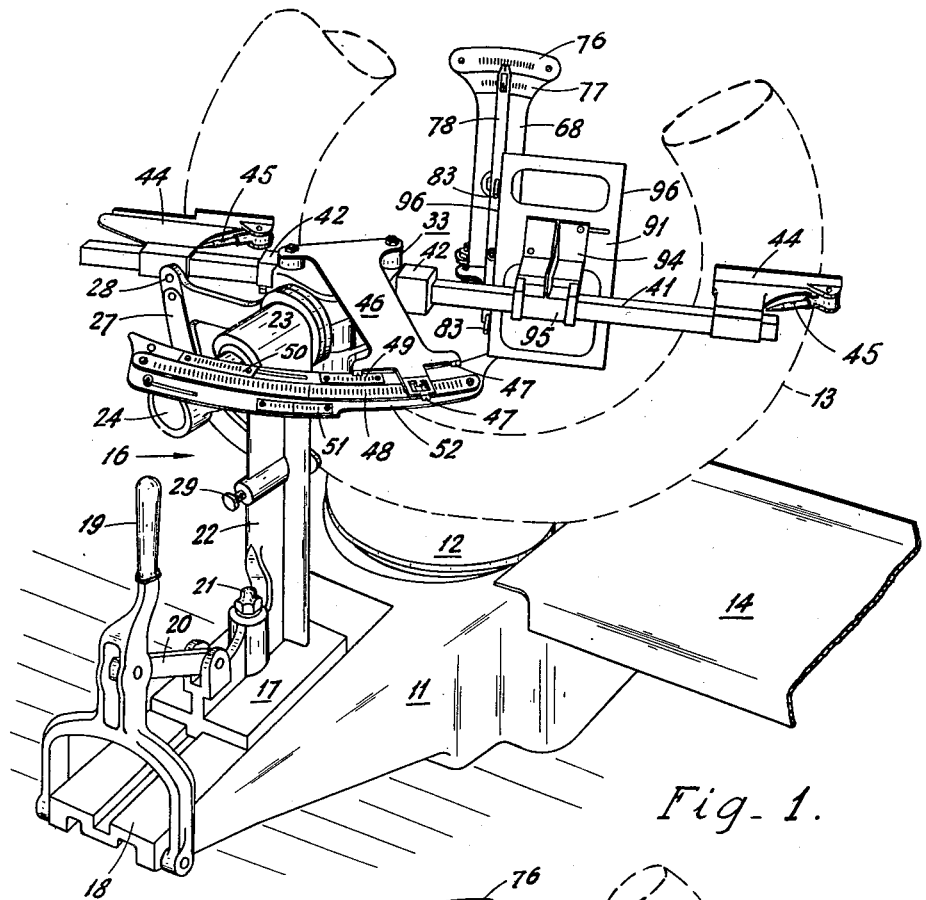
Fig. 1 is a perspective view of a standard type of aligning head having my king pin inclination gauge installed therein. The view shows diagrammatically a wheel in testing position with respect to the head and turned out from its straight ahead position through a selected angle.
Fig. 2 is a perspective view on a reduced scale of the structure shown in Fig. 1 with the wheel turned in from its straight ahead position through the same angle.

As is well-known, the angular positioning of the spindle of an automobile wheel varies as the wheel is turned from one side to the other because of the angle of inclination of the king pin about which the spindle is mounted. It is well known that because of this change in angular relation there is an apparent rotation of the spindle about the wheel axis, and I prefer to utilize this apparent rotation in gauging the king pin inclination of automotive vehicle wheels.

I prefer to employ a gauging device of the type which can be removably applied to the wheel and to an aligning head of standard construction so that the gauging device can be readily used with aligning apparatus already installed, and affords an accurate, simple and reliable means of testing the king pin inclination.

For illustrative purposes, I have chosen to disclose my invention as applied to aligning apparatus of the character described in the patent to Morse et al. No. 2,061,326, dated November 17, 1936. Because similar parts are associated with each front wheel of the automobile, only one side of the aligning apparatus is shown, and such apparatus may include a base 11 (Fig. 1) on which a disc or turntable 12 is rotatably mounted to receive the wheel 13 which is driven thereon over a stationary track 14 suitably supported at one end on the base 11. Also mounted on the base 11 is an aligning head indicated generally at 16 and having its base plate 17 mounted for sliding movement on a grooved horizontal surface 18 of the base. In this manner, the aligning head can be adjusted inwardly and outwardly with respect to the wheel by means of an adjusting lever 19 pivotally mounted on the base 11 and connected to the base plate 17 by means of a link 20. The head may be frictionally held in any adjusted position thereof on the surface 18 by any suitable friction means such as indicated at 21.

Upright standard 22 (Figs. 1 and 2) of the aligning head is formed integrally with base plate 17 and is provided at its upper end with a horizontal boss 23 (Figs. 1 through 3) in which a horizontal shaft 24 is journalled. The shaft 24 is held against endwise movement by flange 25 thereof and a split ring 26 engaged with a suitable annular groove in the shaft. Interposed between the flange 25 and the boss 23 is an arcuate sector 27 secured on the shaft 24 and having fastening apertures 28 at the ends of the outer flange thereof to receive spring urged latching pin 29 whereby the shaft 24 and parts carried thereby can be adjusted to either of two positions 90° apart.

At its inner end, the shaft 24 (Fig. 3) is provided with a boss 31 having its aperture extending at right angles to the shaft axis to receive a pivot pin 32 for an aligning bar bracket 33 having spaced apart bosses 34 to receive the projecting ends of the pin 32 and to engage the respective ends of the shaft boss 31. Thus, in addition to its relative movement with shaft 24, the bracket 33 can be rotated about the axis of the pin 32, and means are provided for maintaining the bracket in any such rotatably adjusted position. For this purpose, a friction disc 36 is seated in a transverse aperture in the shaft 24 and urged by a spring 37 against a projecting flange 38 of the bracket 33.

Figure 3:
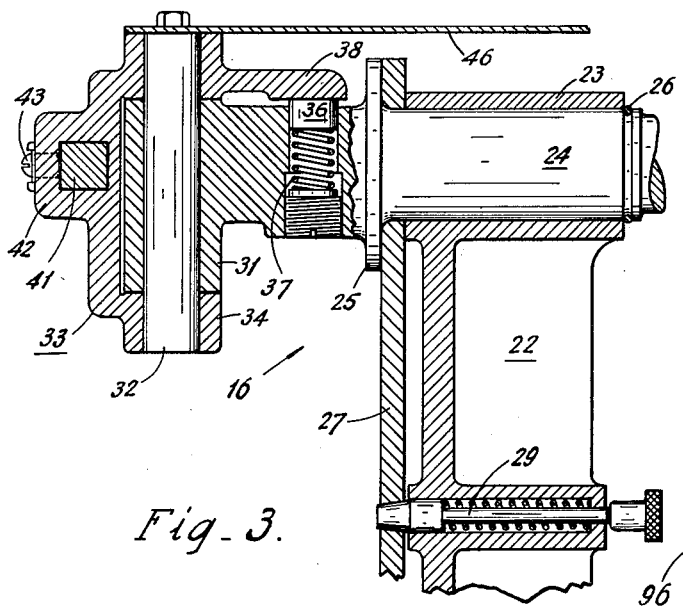
Fig. 3 is an enlarged fragmentary vertical section through the horizontal axis of the aligning head.

The aligning bar bracket 33 provides a mounting for an aligning bar 41 (Figs. 1, 2 and 3) of rectangular cross section and slidably received in spaced bosses 42 of the bracket 33, the adjusted position of the bar 41 with respect to the bracket being maintained by suitable means such as a friction pin indicated at 43 in Fig. 3.

On the respective ends of the aligning bar 41, a pair of contact shoes 44 (Figs. 1 and 2) are slidably mounted so as to engage the tire of the wheel. Shoes 44 are also provided with pivotally mounted contact pins 45 which can be adjusted if desired to contact the felly of a wheel. By this means, measurements can be taken either from tire walls or from the wheel felly, according to preference of the operator.

From the above description, it will be seen that the angular position of the aligning bar 41 can be varied in accordance with the angular position of the wheel in either a vertical or horizontal position of the bar 41, and indicating means are associated therewith to provide an indication of the amount of variation. For this purpose, the bracket 33 carries a pointer or index member 46 having four spaced apart index marks 47, for cooperation with respective scales 48, 49, 50 and 51, carried by a scale plate 52 which is supported by bracket 53 (Fig. 2) on the outer end of shaft 24. The various scales are calibrated to cooperate with their associated pointers in providing indications of various alignment characteristics of a dirigible wheel. The angular position of the wheel to either side of straight ahead position is read on scale 48, while camber is read on scale 49, caster is read on scale 50, and toe-in and toe-out are read on scale 51. The operation of the aligner in determining these various factors is not essential to an understanding of the present invention, and is therefore omitted, and, if a description of such operation is desired, such may be had by reference to the above patent.

For the present purposes, it is sufficient to understand that the scale 48 provides an indication of the angle through which a wheel is turned to either side of straight ahead position, which position is indicated when the associated pointer 47 is aligned with the long central mark on the scale 48. This reading is taken with the aligning bar in horizontal position as illustrated in the drawings.

My invention contemplates the association with the above structure of a gauging device for determining the king pin inclination of a wheel as noted above, and such device is composed of two parts, one of which is mounted for movement as a unit with the spindle of the wheel and including a scale and a pointer cooperating therewith, and the other of which includes a contacting and positioning means for the pointer in the form of a gauge plate detachably mounted on the aligning bar for cooperation with the pointer supported on the spindle.

The scale and indicator part of my device may include a split clevis or bracket comprising spaced apart bars 61 and 62 (Figs. 4 and 5) connected by clamping screws 63 and centrally recessed to engage the spindle nut 64 on the wheel spindle 65. As seen most clearly in Fig. 5, the bar 61 is provided with an upstanding boss 66 which is centrally apertured to receive a pivot pin 67 having an enlarged flange integrally secured in a corresponding aperture in upright scale plate 68. A friction disc 70 is interposed between a plate 69 secured to the lower end of the scale plate 68 and the boss 66, the entire assembly being yieldably urged together by spring 71 seated in a recess of boss 66 about the pin 67 and compressed between the end of the recess and an adjusting nut 72 on the pin 67.

It is seen, therefore, that the scale plate is mounted for rotative adjustment on the supporting bracket and is yieldably held by friction in any adjusted position thereof. At its upper end, the plate 68 is provided with a scale 76 and a scale 77 for reading king pin inclination and caster change respectively, the scales being releasably secured on the plate by suitable fastening screws. For cooperating with the scales, an indicator or pointer 78 is pivotally mounted on the pin 67 and is spring urged against the plate 68 by compression spring 79 compressed between the pointer and a suitable washer on the pin 67.

At its upper end, the pointer 78 is provided with an index 81 to cooperate with the king pin inclination scale 76 and vertically spaced below at the lower edge of an aperture therein a second index 82 to cooperate with the caster change scale 77. The pointer 78 is provided with a pair of abutments or contact pins 83, one to each side of its pivotal axis, which have reduced ends extending through the pointer to receive respective fastening nuts 84 threaded thereon. The upper nut 84 is disposed within an aperture 85 of the plate 68 and serves to prevent excessive angular movement of the pointer 78 relative to the scale.

Figure 7:
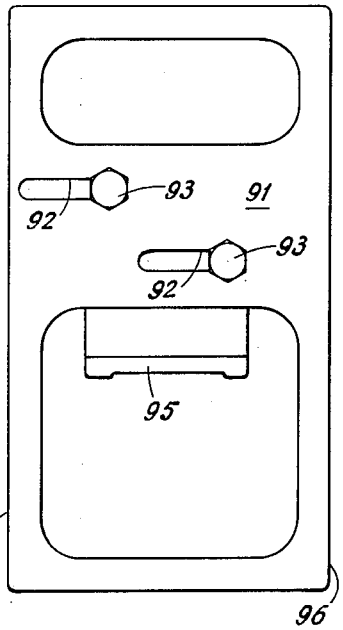
Fig. 7 is a front elevation of such contacting and positioning means.
Figure 6:
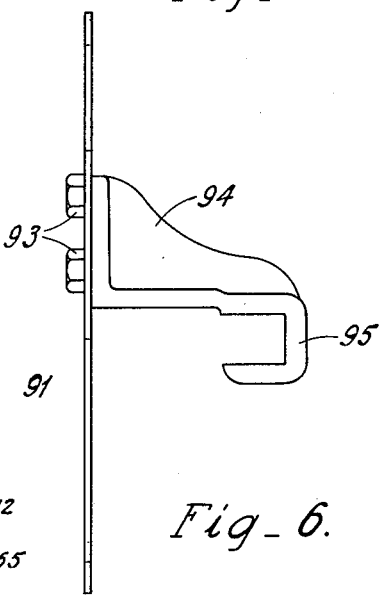
Fig. 6 is a side elevation of the indicator contacting and positioning means.

A contacting and positioning device is provided for cooperation with the indicating part of my gauge device, and such device is preferably in the form of an apertured plate 91 (Figs. 6 and 7) provided with transverse slots 92 through which fastening screws 93 extend for threaded engagement with the supporting bracket 94. The bracket 94 is provided with a depending grooved boss 95 of suitable size to fit closely and slidably over the aligning bar 41 of the aligning head. With the aligning bar in the position shown in Figs. 1 and 2 and the contact plate 91 mounted thereon, its respective side edges 96 are vertical although it is not necessary to the operation of the device that they be exactly so, it only being essential that the respective edges 96 be parallel.

With the above description of the structure it is believed that the function and advantages of my king pin inclination gauge can best be described in connection with its operation in determining the king pin inclination of an automobile wheel.

Figures 4, 5:
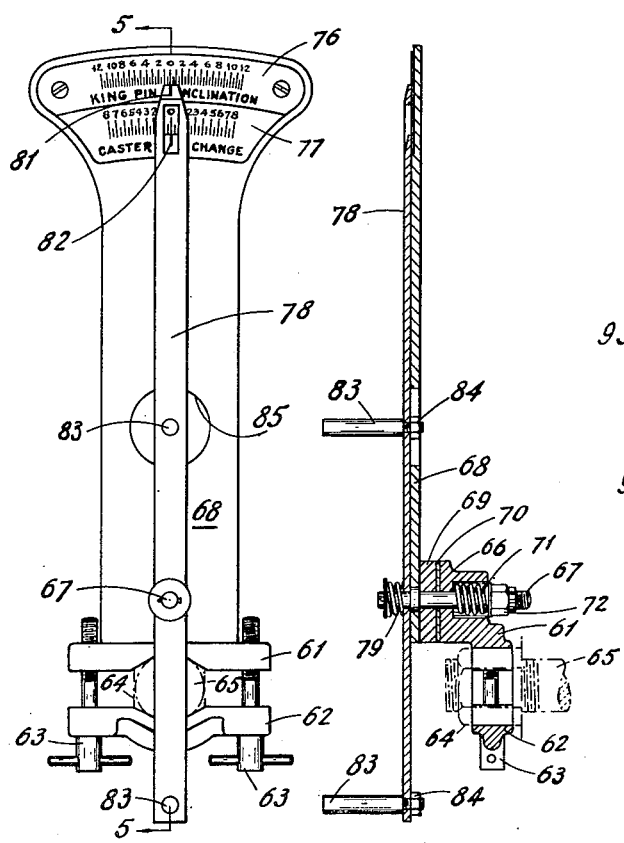
Fig. 4 is a front elevation of the indicator and scale means of the king pin inclination gauge as it would be installed on the spindle of a wheel.
Fig. 5 is a vertical transverse section of the structure shown in Fig. 4, the view being taken in the plane of the line 5—5 in Fig. 4.

The first step in the operation is to mount the pointer and scale assembly on the spindle nut of the wheel to be tested as shown in Figs. 4 and 5 with the aligning bar of the aligning head in its horizontal position as shown in Figs. 1 and 2, and this should be done so that the scale plate can be rocked back and forth without moving the clamp on the nut. Then, the wheel is turned out to a selected angle, as, for example, 20° as illustrated in Fig. 1, by aligning the associated pointer 47 with the 20° mark of the scale 48, with the shoes 44 engaging the wheel tire. Then the plate 91 is mounted on the bar 41 and slid therealong until its adjacent edge 96 engages both contact pins 83, so that the pointer is aligned with edge 96. Then the scale plate 68 is adjusted about its axis until the index 81 reads on the zero mark of the king pin inclination scale 76.

The contact plate 91 is then removed from the bar 41 and the wheel is turned in from its straight ahead position through the same selected angle, i. e., 20°, and the plate 91 is then again placed on the bar 41 with its opposite edge 96 from that first used contacting the pins 83. In so contacting the pins 83, the pointer will have been moved through an angular distance corresponding to the apparent rotation of the spindle and the scale, and the index 81 will then read the king pin inclination. It will be noted that in the respective adjusted positions of the wheel illustrated in Figs. 1 and 2, the aligning bar 41 must be moved endwise in its supports to enable the cooperation of shoes 44 with the wheel so that a contact plate 91 of the type illustrated must be first placed on one end of the bar and then on the other to cooperate with the contact pins. This is due to the particular form of aligning apparatus with which the invention is illustrated and with other forms of apparatus a single edge on the contact plate 91 would suffice to carry out the operation noted above.

The above gauging device can also be used to measure the caster change, and for this purpose the scale 77 is provided and is calibrated to read the amount of caster change with index 82. For this operation, the caster angle is measured in the regular way by turning the wheel out from straight ahead position through a selected angle with bar 41 in vertical position, and then setting the scale 50 to read zero, then turning the wheel in from straight ahead position through the same selected angle when the caster is shown on the scale 50. The regular caster correction tools are then set up and the gauge device of my invention installed with bar 41 in horizontal position and with the plate 91 engaging the contact pins 83. The scale plate 68 is then rotated until the index 82 reads the amount of caster on the scale 77. This should be done by placing the zero in front of the pointer if the caster is to be increased, and by placing the zero to the rear of the pointer if the caster is to be reduced, in order to obtain true readings on the scale. The caster correction is then made and the contact plate 91 again engaged with the pins 83 after which the amount of the change in caster of the wheel can then be read directly on the scale 77. It will be noted that the scale 77 is calibrated to read the amount of change of caster, and therefore cannot be used in determining the caster.

While I have shown and described a preferred form of the invention, it is to be understood that it is capable of variations and changes from the embodiments shown without departing from the spirit of the invention. I desire it to be understood, therefore, that the scope of the invention should be limited only by the scope of the appended claims.

I claim:

1. The combination with a wheel algning head having an aligning bar adjustable into parallel relation with the plane of a dirigible wheel in angularly adjusted positions thereof and indicating means associated with said bar for indicating the angular relation of a wheel to its straight ahead position; of a scale and pointer assembly for mounting on a wheel, and gauge means on said bar for adjusting the pointer relative to the scale to give an indication of tilt of the king pin.

2. The combination with a wheel aligning head having an aligning bar adjustable into parallel relation with the plane of a dirigible wheel in angularly adjusted positions thereof, and indicating means associated with said bar for indicating the angular relation of a wheel to its straight ahead position; of a scale and pointer assembly for mounting on the spindle of a wheel, and gauge means detachably mounted for sliding movement on said bar for adjusting the pointer relative to the scale to give an indication of tilt of the king pin.

3. The combination with a wheel aligning head having an aligning bar adjustable into parallel relation with the plane of a dirigible wheel in angularly adjusted positions thereof, and indicating means associated with said bar for indicating the angular relation of a wheel to its straight ahead position; of a scale, means for mounting said scale on a wheel spindle for adjustment relative to the spindle and for movement therewith in a selected adjusted position thereon, a pointer cooperating with said scale, and gauge means on said bar for adjusting said pointer relative to said scale to give an indication of tilt of the king pin.

4. The combination with a wheel aligning head having an aligning bar adjustable into parallel relation with the plane of a dirigible wheel in various angularly adjusted positions thereof, and indicating means associated with said bar for indicating the angular relation of a wheel to its straight ahead position; of a scale, means for mounting said scale on a wheel spindle for adjustment relative to the spindle and for movement therewith in a selected adjusted position thereon, a pointer cooperating with said scale, and gauge means detachably mounted for sliding movement on said bar for adjusting said pointer relative to said scale to give an indication of tilt of the king pin.

5. The combination with a wheel aligning head having an aligning bar adjustable into parallel relation with the plane of a dirigible wheel in angularly adjusted positions thereof, and indicating means associated with said bar for indicating the angular relation of a wheel to its straight ahead position; of a scale, means for mounting said scale on a wheel spindle for adjustment relative to the spindle and for movement therewith in a selected adjusted position thereon, and means including a member on said bar for providing an indication on said scale of the rotation of said scale with the spindle during a selected amount of steering movement of the wheel to give an indication of tilt of the king pin.

6. The combination with a wheel aligning head having an aligning bar adjustable into parallel relation with the plane of a dirigible wheel in anguluarly adjusted positions thereof, and indicating means associated with said bar for indicating the angular relation of a wheel to its straight ahead position; of a scale, means for mounting said scale on a wheel spindle for adjustment relative to the spindle and for movement therewith in a selected adjusted position thereon, and means including a member detachably mounted for sliding movement on said bar for providing an indication on said scale of the rotation of said scale with the spindle during a selected amount of steering movement of the wheel to give an indication of tilt of the king pin.

7. The combination with a wheel aligning head having a support for movement into predetermined relation with a dirigible wheel in angularly adjusted positions thereof, and indicating means associated with said support for indicating the angular relation of a wheel to its straight ahead position; of a scale and pointer assembly for mounting on a wheel, and gauge means on said support for adjusting the pointer relative to the scale to give an indication of tilt of the king pin.

8. The combination with a wheel aligning head having a support for movement into predetermined relation with a dirigible wheel in angularly adjusted positions thereof, and indicating means associated with said support for indicating the angular relation of a wheel to its straight ahead position; of a bracket for mounting for movement as a unit with a wheel, a scale mounted for adjustment about an axis on said bracket, an index mounted for adjustment relative to said scale about said scale axis, abutments on said index at opposite sides of the pivotal axis thereof, and a gauge mounted on said support for engaging said abutments to move said index to a selected angular position to give an indication of tilt of the king pin.

9. Wheel aligning apparatus for use in determining the king pin inclination of a dirigible vehicle wheel, comprising a scale, means for mounting said scale on a wheel for angular adjustment relative thereto and for movement as a unit therewith, an index cooperating with said scale to indicate the angular movement thereof about the wheel axis resulting from a selected steering movement of the wheel, and an index setting device movable into and out of engagement with said index for adjusting said index to a predetermined angular position irrespective of the angular position of said scale.

10. Wheel aligning apparatus for use in measuring tilt of the king pin, comprising a bracket for attachment to the spindle of a dirigible wheel for movement as a unit therewith, a scale mounted on said bracket for pivotal adjustment about an axis parallel to the spindle axis, an index mounted for pivotal movement about said scale axis, and an index setting device movable into and out of engagement with said index for setting said index to a predetermined angular position irrespective of turning of said spindle on steering movement of the wheel.

11. Wheel aligning apparatus for use in measuring tilt of the king pin, comprising a bracket for attachment to the spindle of a dirigible wheel for movement as a unit therewith, a scale mounted on said bracket for pivotal adjustment about an axis parallel to the spindle axis, an index mounted for pivotal movement about said scale axis, means for determining steering movement of the wheel through a predetermined angle, and an index setting device movable into and out of engagement with said index for setting said index to a predetermined angular position irrespective of turning of said spindle on steering movement of the wheel.

12. Wheel aligning apparatus for use in measuring tilt of the king pin, comprising a bracket for attachment to a dirigible wheel for movement as a unit therewith, a scale mounted on said bracket for pivotal adjustment about an axis, an index mounted for pivotal movement about said scale axis, means for determining steering movement of the wheel through a predetermined angle, and an index setting device movable into and out of engagement with said index for setting said index to a predetermined angular position irrespective of turning of said spindle on steering movement of the wheel.

13. Wheel aligning apparatus for use in measuring the tilt of the king pin, comprising a bracket for attachment to a dirigible wheel for movement as a unit therewith, a scale mounted on said bracket for pivotal adjustment about an axis parallel to the wheel axis, an index mounted for pivotal movement about said scale axis, means adjustable into parallel relation with the plane of the wheel for moving said index to a predetermined angular position, and a scale associated with said adjustable means for measuring the angular adjustment of the wheel from straight ahead position.

14. Wheel aligning apparatus for use in measuring the tilt of the king pin, comprising a bracket for attachment to the spindle of a dirigible wheel for movement as a unit therewith, a scale mounted on said bracket for pivotal adjustment about an axis, an index mounted for pivotal movement about said scale axis, means adjustable into parallel relation with the plane of the wheel for moving said index to a predetermined angular position, and a scale associated with said adjustable means for measuring the angular adjustment of the wheel from straight ahead position.

15. Wheel aligning apparatus for use in measuring tilt of the king pin, comprising a scale, means for mounting said scale for movement as a unit with the spindle of a dirigible wheel, an index cooperating with said scale to read the angular movement thereof about the spindle axis resulting from a predetermined steering movement of the wheel, and gauge means movable into and out of engagement with said index for moving said index to a selected adjusted position thereof.

16. Wheel aligning apparatus for use in measuring tilt of the king pin, comprising a bracket for attachment to the spindle of a dirigible wheel for movement as a unit therewith during steering movement of the wheel, a scale mounted for adjustment about an axis on said bracket, an index mounted for adjustment relative to said scale about said scale axis, abutments on said index at opposite sides of the pivotal axis thereof, a plate, and means mounting said plate for movement into engagement with said abutments to move said index to a selected angular position.

17. Wheel aligning apparatus for use in measuring tilt of the king pin, comprising a bracket for attachment to the spindle of a dirigible wheel for movement as a unit therewith during steering movement of the wheel, a scale mounted for adjustment about an axis on said bracket, an index mounted for adjustment relative to said scale about said scale axis, means for releasably holding said scale and said index in any adjusted position thereof, abutments on said index at opposite sides of the pivotal axis thereof, a plate, and means mounting said plate for movement into engagement with said abutments to move said index to a selected angular position.

HERBERT GLENN HOLMES.